3,823,193
PROCESS FOR THE CONTINUOUS PREPARATION OF DICHLOROPROPANOLS
Hans Fernholz, Fischbach, Taunus, and Dieter Freudenberger, Hofheim, Taunus, Germany, assignors to Farbwerke Hoechst Aktiengesellschaft vormals Meister Lucius & Bruning, Frankfurt am Main, Germany
No Drawing. Filed Feb. 18, 1971, Ser. No. 116,627
Claims priority, application Germany, Feb. 20, 1970,
P 20 07 867.5
Int. Cl. C07c 31/34
U.S. Cl. 260—633                                   6 Claims

ABSTRACT OF THE DISCLOSURE

The present invention relates to a process for the continuous preparation of dichloropropanol from allyl alcohol and chlorine in the presence of an ether which has a boiling point of below 170° C. and which has been saturated with hydrogen chloride, which process also comprises separating the ether from the dichloropropanol and recirculating it into the chlorination of allyl alcohol.

---

The present invention relates to a process for preparing continuously 1,2-dichloropropanol-(3) and 1,3-dichloropropanol-(2) by adding chlorine to allyl alcohol.

It has been known that chlorine can be added to allyl alcohol without any auxiliary agents, however, very moderate yields are obtained that way. It has also been known that the chlorination of allyl alcohol can be effected in the presence of hydrogen chloride which is used in the form of a gas or in the form of a solution, for example in carbon tetrachloride, or as hydrochloric acid. These processes, too, have certain drawbacks, in particular when operating continuously. Thus, for example, the separation of the reaction product from the aqueous phase is rather complicated if hydrochloric acid is used; the yields are detrimentally affected by the formation of by-products like diallyl ether. Carbon tetrachloride as a solvent absorbs a relatively small amount of hydrogen chloride, which reduces the concentration of the catalyst and the yields, too.

Surprisingly, it has been found that mixtures of dichloropropanols which consist mainly of 1,2-dichloropropanol-(3) can be prepared continuously in an excellent way, if the reaction of the allyl alcohol with chlorine is effected in ethers that have been saturated with hydrogen chloride. A process has been found for the continuous preparation of dichloropropanol from allyl alcohol and chlorine in the presence of hydrogen chloride, which comprises reacting allyl alcohol with chlorine in the presence of an ether which has a boiling point, under normal conditions, of below 170° C., preferably below 150° C., and which has been saturated with hydrogen chloride, separating the ether saturated with hydrogen chloride from the dichloropropanol by distillation and recirculating that ether into the chlorination of the allyl alcohol.

The following ethers, for example, are suitable for the process in accordance with the invention: diethyl ether, dipropyl ether, di-isopropyl ether, dibutyl ether, di-isobutyl ether, and tetrahydrofurane. Preference is given to diethyl ether and di-isopropyl ether. These ethers are particularly suitable for the continuous chlorination of allyl alcohol, as they absorb hydrogen chloride very easily and can be separated from the dichloropropanol practically quantitatively, together with the hydrogen chloride, by way of evaporation. The ether that has been saturated with hydrogen chloride may be used, after condensation, for further chlorination processes, i.e. it can be recirculated. The process of the invention for the continuous preparation of dichloropropanols thus comprises the following steps: first, allyl alcohol, in admixture with an ether that has been saturated with hydrogen chloride is reacted with the stoichiometric amount of chlorine, the ether saturated with hydrogen chloride is then separated from the reaction product by evaporation and is subsequently recirculated in the chlorination process after condensation.

The chlorination process can be effected under normal pressure or overpressure, already a minor overpressure of, for example, about 0.5 atmosphere increases the yield by several percent.

The reaction temperature may be in the range of from +10 to —50° C. A temperature range of from 0° C. to —40° C., preferably of from —6 to —25° C. is suitably chosen. Low temperatures increase the absorbing capacity for gaseous hydrogen chloride, which has a favourable effect on the reaction and reduces the formation of by-products. However, if the amount of ether—and thus the amount of hydrogen chloride—are increased, the reaction may also be effected at a higher temperature.

In the process of the invention the amount of ether is generally between 3 and 30 parts by weight, calculated on 1 part by weight of allyl alcohol. Particularly suitable are from 5 to 20 parts by weight, calculated on 1 part by weight of allyl alcohol; preferably from 8 to 14 parts by weight are used.

The relatively large amount of ether has the advantage that the formation of undesired condensation products, such as diallyl ether or tetrachlorodipropyl ether, is practically completely avoided, which occurs in known processes to a large degree, if reaction mixtures of a higher concentration are used without any solvents.

The chlorination may be effected in the presence of further catalysts, however, the process using hydrogen chloride only is preferred. Minor amounts of water do not adversely affect the reaction, however, starting products are used which contain as little water as possible.

According to the preferred variant of the process of the invention, allyl alcohol is pumped over a precooling device into a cooled reaction tube containing filling bodies. At the same time precooled ether, which has been saturated with gaseous hydrogen chloride is added in dosed quantities. After both substances have been mixed in a precooling section of the reaction tube, an additional amount of gaseous hydrogen chloride is added until the mixture is completely saturated, and, after having passed another cooling section, the mixture is reacted with chlorine in a stoichiometric amount, calculated on allyl alcohol. The cold solution discharged from the reactor is then introduced into an evaporating apparatus. The ether and hydrogen chloride are separated by distillation; after they have been condensed and mixed, both substances are recirculated into the reaction tube, which closes the cycle of solvent and gaseous hydrogen chloride. After the reaction has been started, generally no further solvents and no additional hydrogen chloride need to be added.

As reaction product, dichloropropanol is obtained at the bottom of the evaporator for ether and hydrogen chloride. After purification by distillation it is obtained in the form of a 97 to 99% mixture of dichloropropanols consisting of about 90% of 1,2-dichloropropanol-(3) and about 10% of 1,3-dichloropropanol-(2). The yields are in the range of from 94 to 98%, calculated on each starting product used. The product obtained is a valuable starting material for the preparation of epichlorhydrin and glycerine.

The following Examples serve to illustrate the invention.

EXAMPLE 1

By means of a dosing device, 642 grams per hour (=900 milliliters per hour) of diethyl ether were introduced continuously into an upright reaction tube which was cooled to —15° C. and filled with Raschig rings. At the same time, hydrogen chloride was introduced until the ether was saturated. At a temperature of —15° C., 58 grams per hour (=66.5 milliliters per hour or 1 mole) of precooled allyl alcohol were added to this mixture and immediately reacted with 22.4 liters per hour of gaseous chlorine which was introduced into the reactor by a separate feed line. The cold reaction mixture emerging from the reactor was freed from diethyl ether and hydrogen chloride in an evaporator, and the mixture of ether and hydrogen chloride was re-introduced continuously into the chlorination apparatus, after having been cooled once more to reaction temperature. The product flowing off at the bottom of the evaporator was purified by distillation. At intervals of 2 hours, 243.5 grams of a dichloropropanol mixture having a boiling point in the range of from 96 to 100° C. under a pressure of 40 mm. of mercury were obtained, which mixture consisted of 87.7% of 1,2-dichloropropanol-(3) and 11.9% of 1,3-dichloropropanol-(2), according to gas chromatographic analysis. The yield was 94.5%.

EXAMPLE 2

The experiment was carried out analogous to that in Example 1, however, at a temperature of —6° C. and under a slight overpressure of 0.5 atmosphere of hydrogen chloride. After a reaction time of two hours with a throughput of 1 mole of allyl alcohol and 1 mole of chlorine per hour, 252.2 grams of dichloropropanol mixture having a boiling point in the range of from 96 to 100° C. under a pressure of 40 mm. of mercury were separated, which corresponded to a total yield of 97.5, calculated on the chlorine used. According to gas chromatographic analysis, the product consisted of 90.1% of 1,2-dichloropropanol-(3) and 9.7% of 1,3-dichloropropanol-(2).

EXAMPLE 3

The reaction was carried out as described in Example 1, however, instead of using diethyl ether, di-isopropyl ether was used in an amount of 500 grams per hour. The reaction temperature in the reaction tube was —10° C. The pressure was 1,000 mm. of mercury. After two hours' reaction, with a charge of 1 mole each of allyl alcohol and 1 mole of chlorine per hour, 249.5 grams of dichloropropanol mixture having a boiling point in the range of from 96 to 100° C. under a pressure of 40 mm. of mercury could be separated. The yield in this case was 96.5%. The composition of the product corresponded to that of Example 2.

EXAMPLE 4

By means of a dosing device, 580 grams per hour of di-isobutyl ether were introduced into the apparatus. The reaction temperature was —8° C. The reaction was effected under normal pressure. After a reaction time of two hours with a charge of 1 mole each of chlorine and of allyl alcohol per hour, 251.3 grams of dichloropropanol mixture having a boiling point of from 96 to 100° C. under a pressure of 40 mm. of mercury were separated. The yield was 97%. According to gas chromatographic analysis, the product consisted of 88.9% of 1,2-dichloropropanol-(3) and 10.3% of 1,3-dichloropropanol-(2).

What is claimed is:

1. A process for the continuous preparation of dichloropropanol from allyl alcohol and chlorine in the presence of hydrogen chloride, which comprises reacting, at a temperature from +10° C. to —50° C., in a chlorination zone allyl alcohol with chlorine in the presence of an ether which has a boiling point, under normal conditions, of below 170° C., selected from the group consisting of diethyl ether, dipropyl ether, di-isopropyl ether, dibutyl ether, di-isobutyl ether and tehahydrofurane, and which ether has been saturated with hydrogen chloride and wherein ether is used in an amount of from 3 to 30 parts by weight, calculated on 1 part by weight of allyl alcohol, separating the ether saturated with hydrogen chloride from the dichloropropanol by distillation and recirculating said ether and said hydrogen chloride into the chlorination zone for allyl alcohol.

2. The process of claim 1, wherein an ether is used which has a boiling point, under normal conditions, of below 150° C.

3. The process of claim 1, wherein diethyl ether is used as ether.

4. The process of claim 1, wherein di-isopropyl ether is used as ether.

5. The process of claim 1, wherein ether is used in an amount of from 8 to 14 parts by weight, calculated on 1 part by weight of allyl alcohol.

6. The process of claim 1, wherein the reaction of allyl alcohol with chlorine is effected at a temperature in the range of from —6° C. to —25° C.

References Cited

UNITED STATES PATENTS

| 2,144,612 | 1/1939 | Britton et al. | 260—633 |
| 3,092,669 | 6/1963 | Denton et al. | 260—633 |
| 3,037,059 | 5/1962 | Kaiser | 260—633 |

FOREIGN PATENTS

| 1,370,448 | 7/1964 | France | 260—633 |

OTHER REFERENCES

Ing, J. Chem. Soc., 1948, pp. 1393–1395.

HOWARD T. MARS, Primary Examiner